US008610829B2

(12) United States Patent
Chang et al.

(10) Patent No.: US 8,610,829 B2
(45) Date of Patent: Dec. 17, 2013

(54) DISPLAY SYSTEM AND METHOD FOR REPRODUCTION OF PROGRAM CONTENTS

(75) Inventors: George K C Chang, Xiamen (CN); Yr. Hong, Xiamen (CN)

(73) Assignee: TPV Display Technology (Xiamen) Co., Ltd., Xiamen, Fujian (CN)

( * ) Notice: Subject to any disclaimer, the term of this patent is extended or adjusted under 35 U.S.C. 154(b) by 0 days.

(21) Appl. No.: 13/478,722

(22) Filed: May 23, 2012

(65) Prior Publication Data

US 2013/0093954 A1    Apr. 18, 2013

(30) Foreign Application Priority Data

Oct. 12, 2011    (TW) .............................. 100136944 A

(51) Int. Cl.
*H04N 5/45* (2011.01)
*H04N 5/445* (2011.01)
*H04N 5/44* (2011.01)

(52) U.S. Cl.
USPC ............................ 348/565; 348/568; 348/734

(58) Field of Classification Search
USPC .................................................. 348/565, 734
See application file for complete search history.

(56) References Cited

U.S. PATENT DOCUMENTS

2004/0066308 A1*    4/2004    Sampsell ................. 340/825.69
2005/0012862 A1*    1/2005    Lee .............................. 348/588

* cited by examiner

*Primary Examiner* — Jefferey Harold
*Assistant Examiner* — Michael Teitelbaum
(74) *Attorney, Agent, or Firm* — Curatolo Sidoti Co., LPA; Joseph G. Curatolo; Salvatore A. Sidoti

(57) ABSTRACT

A display system includes a display device and a mobile device. The display device includes a signal receiving unit for receiving program signals, a processing unit operable to convert the program signals into program contents, and to encode one of the program contents into program packets, a first output unit operable to reproduce the program contents, and a first communication unit to transmit the program packets. The mobile device includes a second communication unit for receiving the program packets, a control unit operable to decode the program packets to recover the transmitted program content, and a second output unit to reproduce the transmitted program content.

11 Claims, 5 Drawing Sheets

DISPLAY SYSTEM AND METHOD FOR REPRODUCTION OF PROGRAM CONTENTS

CROSS-REFERENCE TO RELATED APPLICATION

This application claims priority to Taiwanese Application No. 100136944, filed on Oct. 12, 2011.

BACKGROUND OF THE INVENTION

1. Field of the Invention

The invention relates to a display system, and more particularly to a display system that is operable to reproduce multiple program contents.

2. Description of the Related Art

With progress of semiconductor technology, liquid crystal displays (LCD) have become thinner, and image quality thereof has become more vivid. It is not uncommon for family members to watch TV together in a living room. However, preferred TV programs among the family members may be different, thereby resulting in inconvenience if the TV can only reproduce one TV program at a time. Some LCD TVs have a picture-in-picture (PIP) function, such that family members can watch different TV programs at the same time. Taking a 62-inch LCD TV as an example, a screen area thereof is more than four times that of a 29-inch LCD TV. If the 62-inch LCD TV displays four sub-images thereon, each sub-image is larger than a full screen area of the 29-inch LCD TV, such that visual reproduction is not affected. Through the PIP function, family members may watch different TV programs using one LCD TV, and the requirement of buying multiple LCD TVs for the family may be alleviated.

However, the PIP function has some drawbacks. One is that buying a large-size LCD TV for PIP viewing is somewhat wasteful. Another is that when watching different TV programs on the LCD TV, audio signals thereof may interfere with each other, or the audio signal of the sub-image may not be outputted.

SUMMARY OF THE INVENTION

Therefore, an object of the present invention is to provide a display system that can overcome the above drawbacks of the prior art.

According to one aspect of the present invention, a display system comprises:

a display device including
a signal receiving unit for receiving a first program signal and a second program signal,
a processing unit coupled to the signal receiving unit for receiving the first and second program signals therefrom, the processing unit being operable to convert the first program signal into first program content, to convert the second program signal into second program content, and to encode the second program content into program packets,
a first output unit coupled to and controlled by the processing unit to reproduce the first program content, and
a first communication unit coupled to and controlled by the processing unit to transmit the program packets; and
a mobile device including
a second communication unit for receiving the program packets,
a control unit coupled to the second communication unit for receiving the program packets therefrom, the control unit being operable to decode the program packets to recover the second program content, and
a second output unit coupled to and controlled by the control unit to reproduce the second program content.

Another object of the present invention is to provide a method implemented by a display device and a mobile device for reproduction of program contents.

According to another aspect of the present invention, a method comprises the steps of:

a) receiving, by the display device, a first program signal and a second program signal;
b) configuring the display device to convert the first program signal into first program content and to reproduce the first program content;
c) configuring the display device to convert the second program signal into second program content, to encode the second program content into program packets, and to transmit the program packets to the mobile device; and
d) configuring the mobile device to receive the program packets, to decode the program packets to recover the second program content, and to reproduce the second program content.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
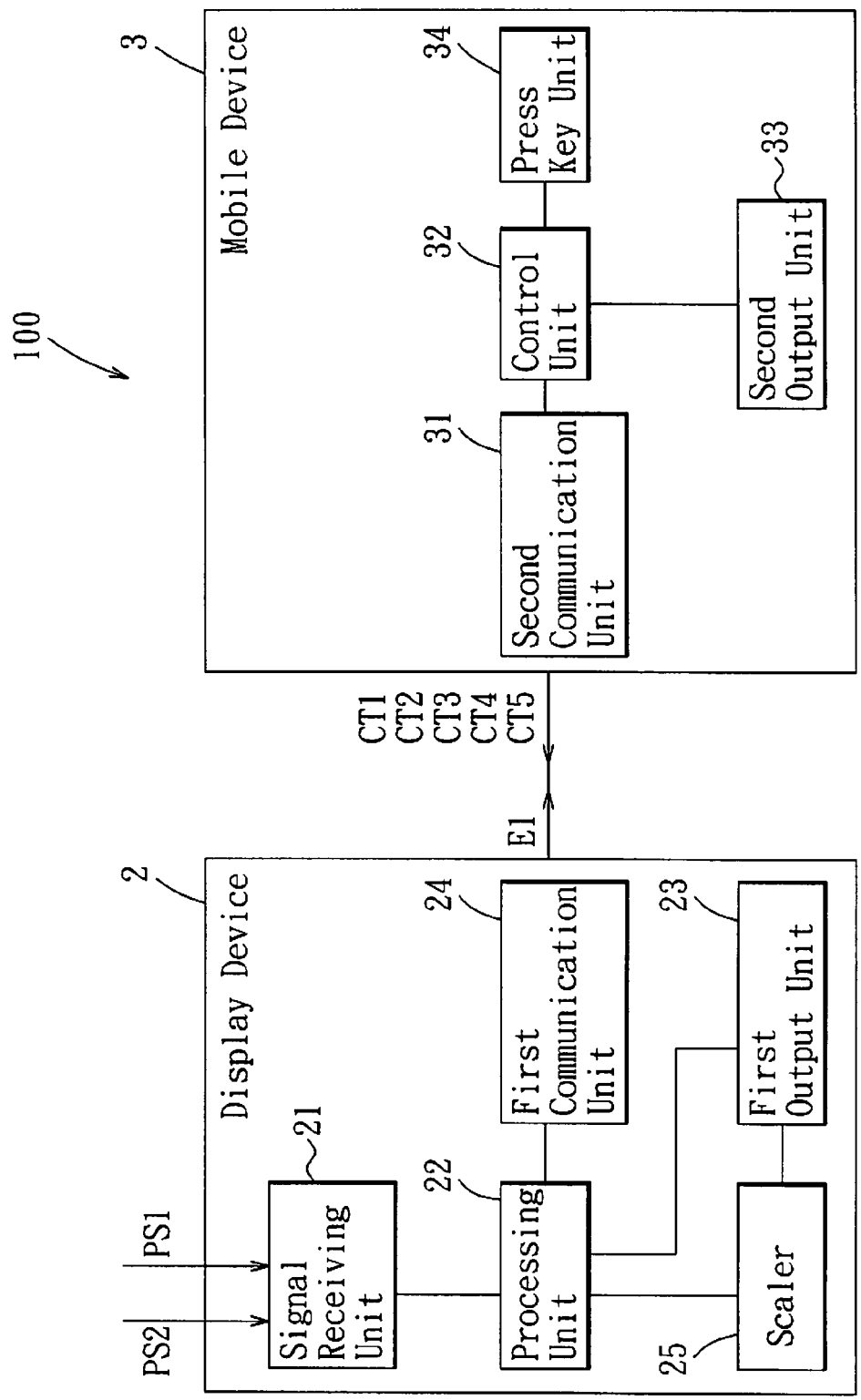
FIG. 1 is a schematic block diagram showing a preferred embodiment of the display system according to the present invention.
Figure 2:
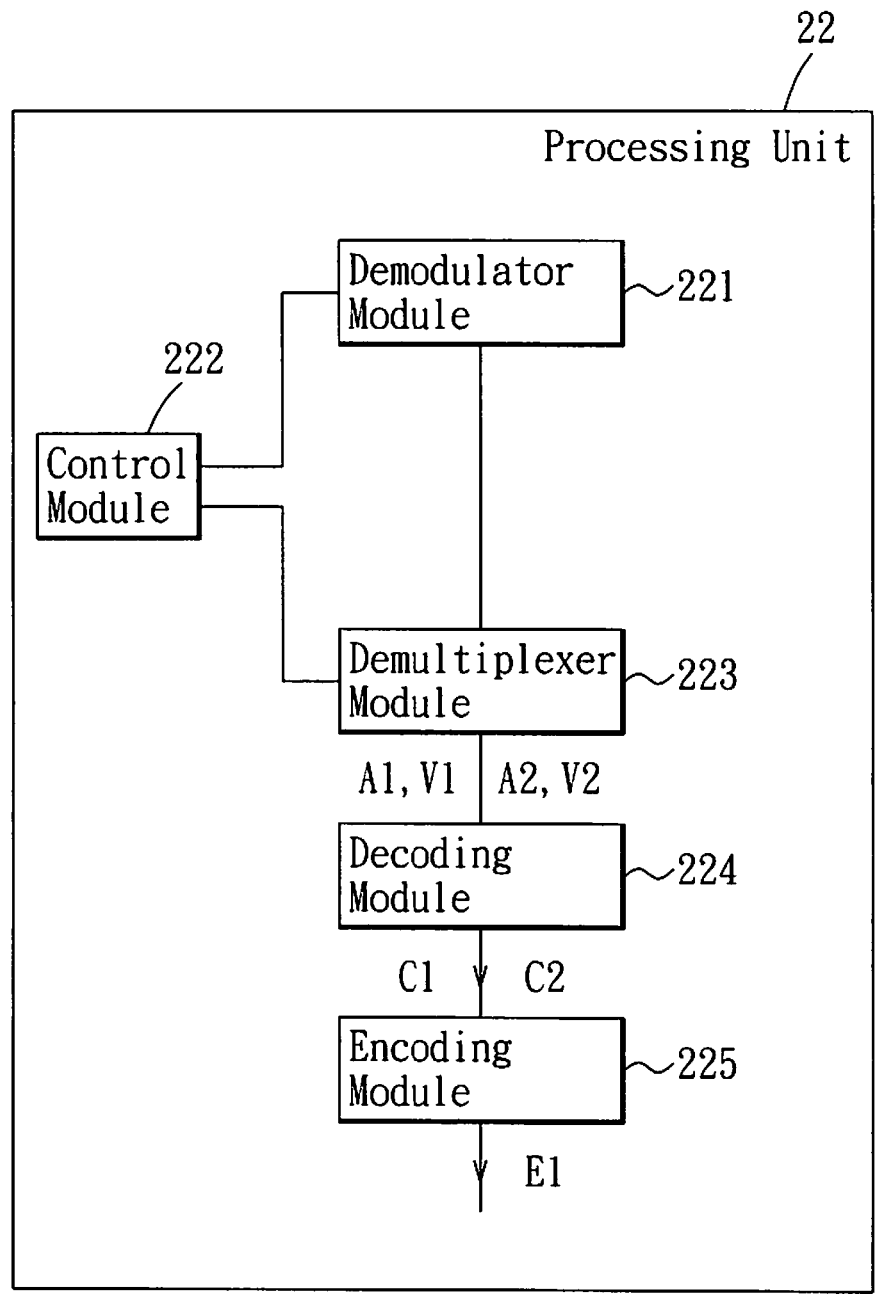
FIG. 2 is a schematic block diagram of a processing unit of the preferred embodiment.

Referring to FIG. 1 and FIG. 2, the preferred embodiment of the display system 100 according to this invention is shown to include a display device 2 and a mobile device 3. The display device 2 includes a signal receiving unit 21, a processing unit 22 coupled to the signal receiving unit 21, a first output unit 23 coupled to the processing unit 22, a first communication unit 24 coupled to the processing unit 22, and a scaler 25 coupled to the processing unit 22 and the first output unit 23. In this embodiment, the display device 2 may be a liquid crystal display television (LCD TV), and the mobile device 3 may be a smartphone.

The signal receiving unit 21 is used for receiving a plurality of program signals of cable TV programs or terrestrial TV programs.

The processing unit 22 includes a demodulator module 221, a control module 222 coupled to the demodulator module 221, a demultiplexer module 223 coupled to the control module 222 and the demodulator module 221, a decoding module 224 coupled to the demultiplexer module 223, and an encoding module 225 coupled to the decoding module 224.

The demodulator module 221 is controlled by the control module 222 to convert program signals into a composite signal composed of an audio signal and a video signal. The demultiplexer module 223 receives the composite signals from the demodulator module 221, and is controlled by the control module 222 to obtain the audio and video signals therefrom. The decoding module 224 is operable to decode the audio and video signals into program contents. The encoding module 225 is operable to encode some of the program contents into respective program packets.

Figure 3:
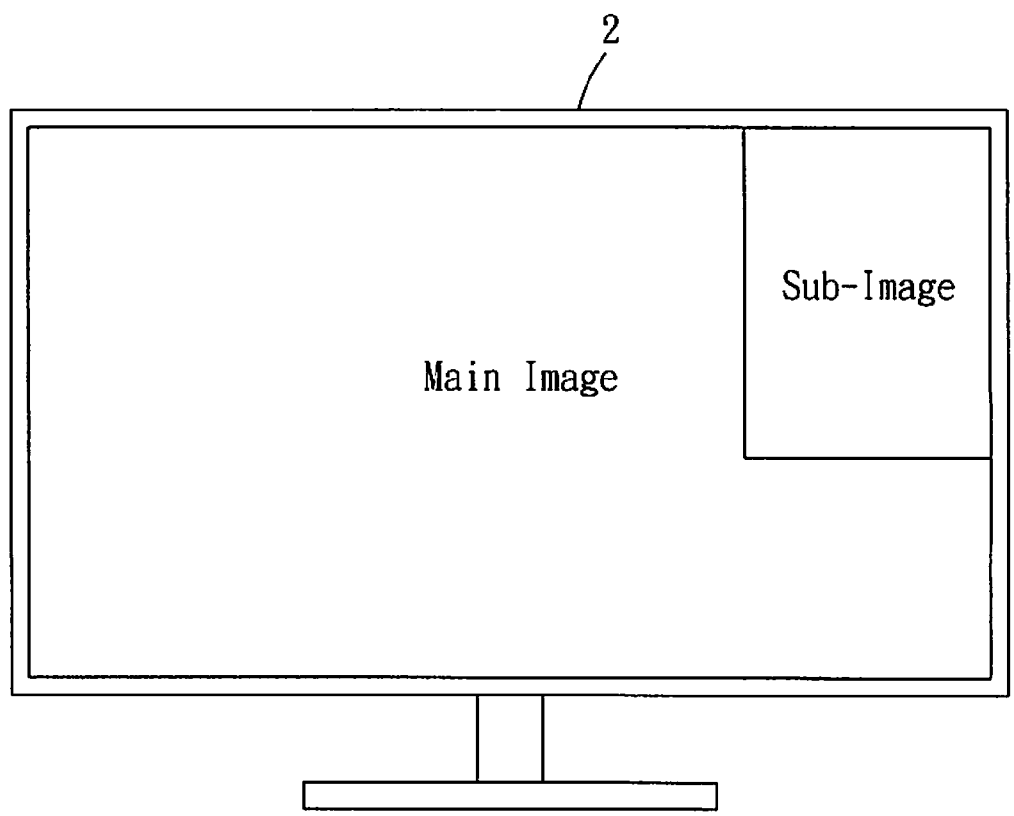
FIG. 3 is a schematic diagram of a display device of the preferred embodiment operating in a picture-in-picture mode.

Referring to FIG. 1 and FIG. 3, the scaler 25 is responsive to control from the processing unit 22 to process the video signals for image quality enhancement, display ratio adjustment, image size scaling, etc., so as to enable the first output unit 23 to reproduce different program contents simultaneously in a picture-in-picture (PIP) format. However, format of image display is not limited thereto, and the scaler 25 is also operable to enable the first output unit 23 to reproduce the program content in a full-screen format.

The first communication unit 24 is controlled by the processing unit 22 to transmit the program packets to the mobile device 3.

The mobile device 3 includes a second communication unit 31, a control unit 32 coupled to the second communication unit 31, and a second output unit 33 coupled to the control unit 32.

The second communication 31 is used for receiving the program packets, the control unit 32 is operable to decode the program packets to recover the program contents thereof, and the second output unit 33 is controlled by the control unit 32 to reproduce the program content recovered by the control unit 32.

In this embodiment, the first communication unit 24 and the second communication unit 31 communicate with each other by wireless communication that conforms with a wireless standard, such as radio frequency, infrared ray, ultra wideband, Bluetooth, wireless fidelity, etc. In other embodiments, the first and second communication units 24 and 31 may communicate using wires.

Figure 4:
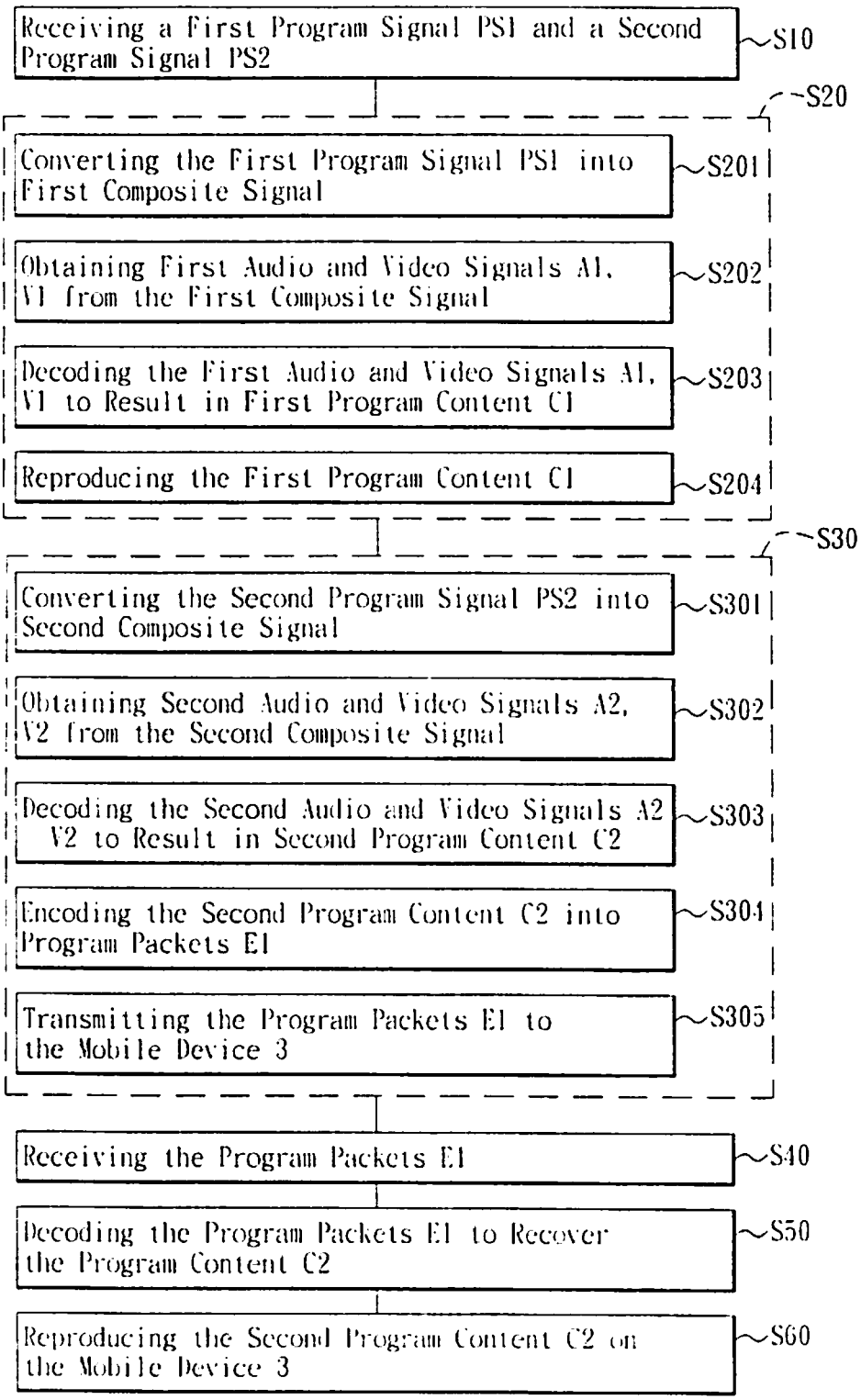
FIG. 4 is a flow chart illustrating operation steps of the display system of the preferred embodiment.

Referring to FIGS. 1, 2, and 4, the display system 100 implements a method for reproduction of program contents, including the following steps.

Step S10: The signal receiving unit 21 of the display device 2 receives a first program signal PS1 and a second program signal PS2 when a user turns on the display device 2.

Step S20: The processing unit 2 converts the first program signal PS1 into first program content C1 and reproduces the first program content C1. In detail, the control module 222 controls the demodulator module 221 to convert the first program signal PS1 into a first composite signal composed of a first audio signal A1 and a first video signal V1 (as shown in Step S201). The demultiplexer module 223 receives the first composite signal from the demodulator module 221 and is controlled by the control module 222 to obtain the first audio signal A1 and the first video signal V1 therefrom (as shown in Step S202). The decoding module 224 decodes the first audio signal A1 and the first video signal V1 to result in the first program content C1 (as shown in Step S203). Thereafter, the control module 222 controls the first output module 23 to reproduce the first program content C1 (as shown in Step S204). In this embodiment, the first program content C1 serves as a main image content to be reproduced by the first output unit 23 according to the first audio signal A1 and the first video signal V1.

Step S30: The processing unit 2 converts the second program signal PS2 into second program content C2, reproduces the second program content C2, encodes the second program content C2 into program packets E1, and transmits the program packets E1 to the mobile device 3. In detail, the control module 222 controls the demodulator module 221 to convert the second program signal PS2 into a second composite signal composed of a second audio signal A2 and a second video signal V2 (as shown in Step S301). The demultiplexer module 223 receives the second composite signal from the demodulator module 221 and is controlled by the control module 222 to obtain the second audio signal A2 and the second video signal V2 therefrom (as shown in Step S302). The decoding module 224 decodes the second audio signal A2 and the second video signal V2 to result in the second program content C2 (as shown in Step S303). Thereafter, the encoding module 225 encodes the second program content C2 into the program packets E1 (as shown in Step S304), and the first communication unit 24 transmits the program packets E1 to the mobile device 3 (as shown in Step S305). It should be noted that the second program content C2 may serve as a sub-image content to be reproduced by the first output unit 23 according to the second audio signal A2 and the second video signal V2.

Step S40: The second communication unit 31 of the mobile device 3 receives the program packets E1.

Step S50: The control unit 32 decodes the program packets E1 to recover the second program content C2.

Step S60: The control unit 32 controls the second output unit 33 to reproduce the second program content C2. In other words, the display system 100 may reproduce two or more received program signals through the display device 2 and at least one mobile device 3, such that each user may individually watch preferred programs through the different mobile devices 3, thereby resulting in enhancement of program watching quality without being limited to watching in front of the display device 2.

Figure 5:
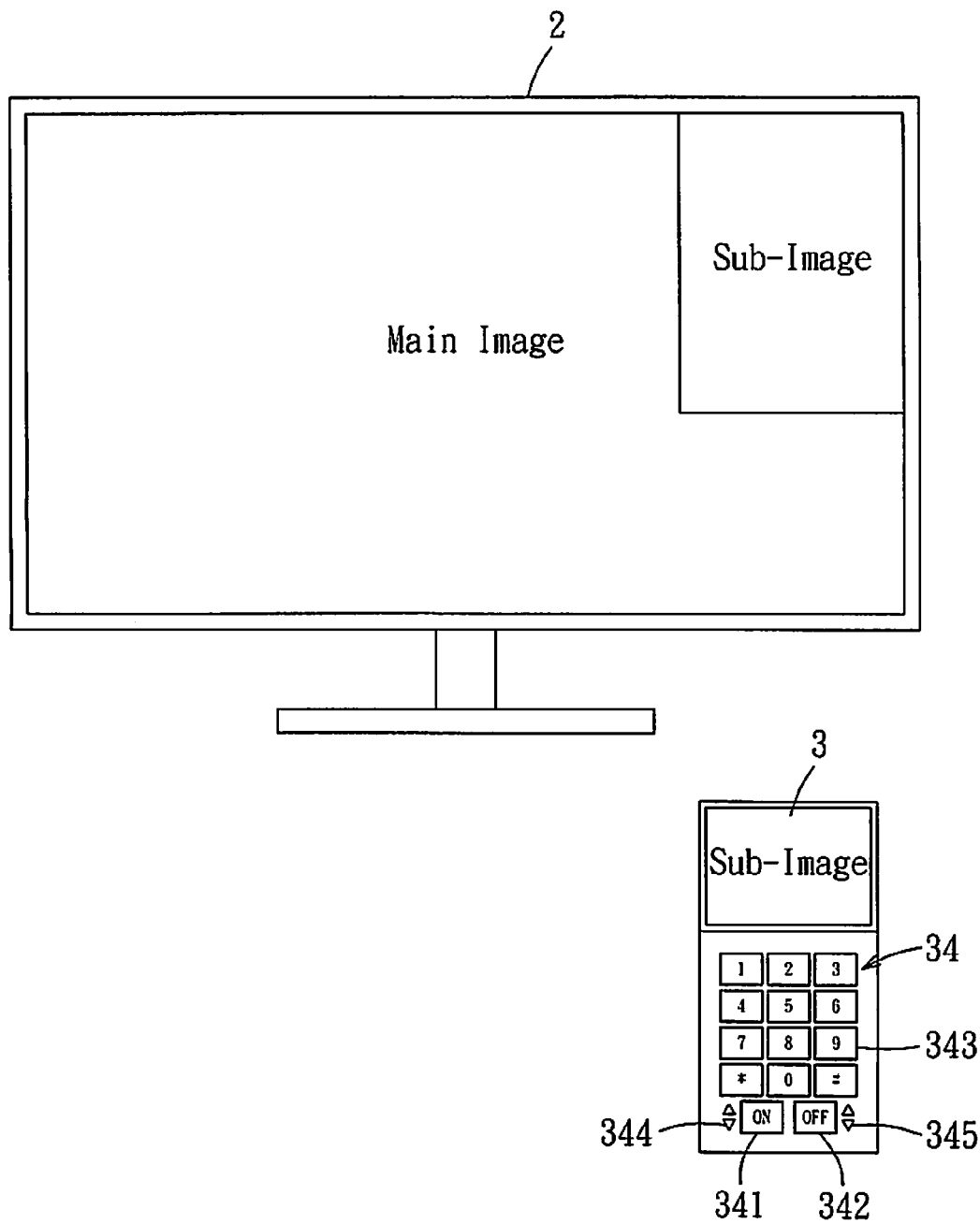
FIG. 5 is a schematic diagram showing the display device and a mobile device of the preferred embodiment.

Referring to FIG. 1 and FIG. 5, the mobile device 3 of this embodiment further includes a press key unit 34 coupled to the control unit 32. The press key unit includes a transmission enabling key 341, a transmission disabling key 342, a plurality of channel numerical keys 343, channel changing keys 344, and volume adjusting keys 345. The transmission enabling key 341 is user-operable to generate a trigger signal, and the control unit 32 is responsive to the trigger signal for transmitting a control signal CT1 to the processing unit 22 via the first communication unit 24 and the second communication unit 31, and for enabling transmission of the program packets E1 to the mobile device 3. Moreover, the control unit 32 is further responsive to trigger signals from the transmission disabling key 342, the channel numerical keys 343, the channel changing keys 344, and the volume adjusting keys 345 to generate respective control signals CT2, CT3, CT4, and CT5, such that the processing unit 22 ends transmission of the program packets E1 according to the control signal CT2, the signal receiving unit 21 changes the second program signal according to the control signals CT3 and CT4, and the volume of the program content C2 reproduced by the mobile device 3 is adjusted according to the control signal CT5. Through the mobile device 3, users may control program selection and volume as desired and with relative ease.

To sum up, the display device 2 is operable to reproduce a program content thereon, and to transmit another program content to the mobile device 3 in the form of program packets, such that users may individually watch the preferred program content via the mobile device 3 without interference from other program contents. Moreover, the display system 100 employs the popularity of smartphones to cooperate with the display device 2 to serve as a second terminal display apparatus, thereby satisfying demands of family members to watch different programs, and may save the cost of buying multiple TVs. The present invention also makes it possible for users to watch TV programs without being limited to be in front of the display device 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A display system comprising:
   a display device including
   a signal receiving unit for receiving a first program signal and a second program signal,
   a processing unit coupled to said signal receiving unit for receiving the first and second program signals therefrom, said processing unit being operable to convert the first program signal into first program content, to convert the second program signal into second program content, and to encode the second program content into program packets,
   a first output unit coupled to and controlled by said processing unit to reproduce the first program content, and
   a first communication unit coupled to and controlled by said processing unit to transmit the program packets; and
   mobile device including
   a second communication unit for receiving the program packets,
   a control unit coupled to said second communication unit for receiving the program packets therefrom, said control unit being operable to decode the program packets to recover the second program content, and
   a second output unit coupled to and controlled by said control unit to reproduce the second program content;
   wherein said processing unit includes;
   a demodulator module operable to convert the first program signal into a first composite signal composed of a first audio signal and a first video signal, and to convert the second program signal into a second composite signal composed of a second audio signal and a second video signal;
   a control module coupled to said demodulator module;
   a demultiplexer module coupled to said control module and said demodulator module, said demultiplexer module receiving the first and second composite signals from said demodulator module, and being controlled by said control module obtain the first and second audio signals and the first and second video signals therefrom;
   a decoding module coupled to said demultiplexer module and operable to decode the first audio signal and the first video signal to result in the program content, and to decode the second audio signal and the second video signal to result in the second program content; and
   an encoding module coupled to said decoding module, and operable to encode the second program content into the program packets.

2. The display system as claimed in claim 1, wherein said display device further includes a sealer coupled to said processing unit and said first output unit, said sealer being responsive to control from said processing unit to enable said first output unit to reproduce said first program content and said second program content simultaneously in a picture-in-picture format, with said first program content serving as a main image content and said second program content serving as a sub-image content.

3. The display system as claimed in claim 1, wherein said mobile device further includes a press key unit coupled to said control unit, said control unit being responsive to user operation or said press key unit for transmitting a control signal to said processing unit via said first communication unit and said second communication unit, the control signal being a program change signal for configuring said processing unit to control said signal receiving unit to change the second program signal.

4. The display system as claimed in claim 1, wherein said mobile device further includes a press key unit coupled to said control unit, said control unit being responsive to user operation of said press key unit for generating a control signal to adjust volume of the second program content reproduced by said mobile device.

5. The display system as claimed in claim 1, wherein said first communication unit and said second communication unit communicate with each other by wireless communication.

6. A display device for use with a mobile device said display device comprising:
   a signal receiving unit for receiving a first program signal and a second program signal;
   a processing unit coupled to said signal receiving unit for receiving the first and second program signals therefrom, said processing unit being operable to convert the first program signal into first program content, to convert the second program signal into second program content, and to encode the second program content into program packets;
   an output unit coupled to and controlled by said processing unit to reproduce the first program content; and
   a communication unit coupled to and controlled by said processing unit to transmit the program packets for receipt by the mobile device;
   wherein said processing unit includes;
   a demodulator module operable to convert the first program signal into a first composite signal composed of a first audio signal and a first video signal, and to convert the second program signal into a second composite signal composed of a second audio signal and a second video signal;
   a control modulo coupled to said demodulator module;
   a demultiplexer module coupled to said control module and said demodulator module, said demultiplexer module receiving the first and second composite signal from said demodulator module, and being controlled by said control module to obtain the first and second audio signals and the first and second video signals therefrom;
   a decoding module coupled to said demultiplexer module and operable to decode the first audio signal and the first video signal to result in the first program content, and to decode the second audio signal and the second video result in the second program content; and
   an encoding module counted to said decoding module, and operable to encode the second program content into the program packets.

7. The display device as claimed in claim 6, further comprising a sealer coupled to said processing unit and said output unit, said sealer being responsive to control from said processing unit to enable said output unit to reproduce said first program content and second program content simultaneosly in a picture-in-picture format, with said first program content serving as a main image content and said second program content serving as a sub-image content.

8. The display device as claimed in claim 6, wherein said communication unit is configured to communicate with the mobile device by wireless communication.

9. A method for reproduction of program contents, said method to be implemented by a display device and a mobile device, and comprising the steps of:
- a) receiving, by the display device, a first program signal and a second program signal;
- b) configuring the display device to convert the first program signal into first program content and to reproduce the first program content;
- c) configuring the display device to convert the second program signal into second program content, to encode the second program content into program packets, and to transmit the program packets to the mobile device; and
- d) configuring the mobile device to receive the program packets, to decode the program packets to recover the second program content, and to reproduce the second program content;

wherin:

in step b), the display device converts the first program signal into a first composite signal composed of a first audio signal and a first video signal, followed by obtaining the first audio signal and the first video signal therefrom, and decoding the first audio signal and the first video signal to result in the first program content; and in step c), the display device converts the second program signal into a second composite signal composed of a second audio signal and a second video signal, followed by obtaining the second audio signal and the second video signal therefrom, and decoding the second audio signal and the second video signal to result in the second program content.

10. The method as claimed in claim 9, wherein, after obtaining the first and second program contents, the display device is operable to reproduce the first and second program contents simultaneously in a picture-in-picture format, with the first program content serving as a main image content and the second program content serving as a sub-image content.

11. The method as claimed in claim 9, wherein the display device is responsive to a control signal, which is a program change signal from the mobile device, to change the second program signal.

* * * * *